United States Patent Office 3,047,568
Patented July 31, 1962

3,047,568
16-CYANO STEROIDS, INTERMEDIATES AND METHOD OF PREPARING SAME
Henry M. Kissman and Arlene M. Hoffman, Nanuet, N.Y., and Martin J. Weiss, Oradell, N.J., assignors to American Cyanamid Company, New York, N.Y., a corporation of Maine
No Drawing. Filed Nov. 23, 1960, Ser. No. 71,129
8 Claims. (Cl. 260—239.55)

This invention relates to new organic compounds. More particularly, it relates to steroids of the androstane and estratriene series.

The novel compounds of the present invention can be illustrated by the following general formula:

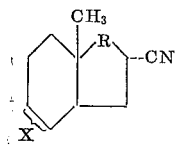

in which R is a divalent radical of the group consisting of

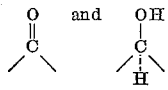

radicals and X is a divalent radical of the group consisting of

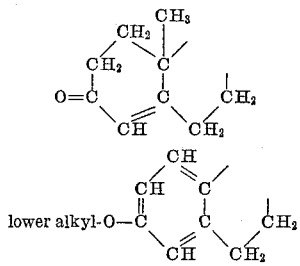

and

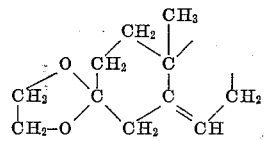

radicals.

The present compounds are, in general, white crystalline solids which are soluble in the usual organic solvents and are insoluble to very slightly soluble in water.

The compounds of the present invention are prepared by reacting a 17-keto steroid with a lower alkyl formate, such as, for example, ethyl formate in the presence of an alkaline condensing agent. The condensing agent can be, for example, sodium hydride, a sodium alkoxide, a potassium alkoxide and the like. The reaction is preferably carried out in a solvent inert to the reactants such as benzene, toluene and the like and at a temperature within the range of 20° C. to 60° C. The reaction at this temperature is complete within a period ranging from about 8 hours to about 72 hours. The preferred temperature and reaction time is about room temperature for about 12 to 16 hours. The resulting 16-hydroxymethylene-17-keto steroid is isolated by extraction into aqueous alkali thereby separating it from unreacted alkali-insoluble starting material. The 16-hydroxymethylene steroid is then obtained by acidifying the aqueous extract. It is purified by the usual crystallization methods well known in the art.

When the 17-keto steroid used as starting material has a 3-keto substituent, this must first be protected by the formation of a 3-ethylene ketal by reaction of the steroid with ethylene glycol. Protection of the 3-keto group is necessary in order to prevent formylation alpha to the 3-keto position. The protected 3-keto group is also desirable in subsequent reduction procedures hereinafter described. The regeneration of the 3-ketone group is conveniently carried out by mild acid hydrolysis.

The hydroxymethylene substituent at the 16-position in the 17-keto steroids is then converted into a cyano substituent by treatment with O,N-bis-(trifluoroacetyl)-hydroxylamine. This reaction is carried out using approximately one equivalent of the hydroxylamine derivative in a solvent inert to the reactant such as benzene, said solvent also containing a tertiary amine such as, for example, pyridine. The temperature at which the reaction will take place may vary from about 20° C. to about 120° C., the preferred temperature being from about 70° C. to about 100° C. The reaction is usually complete in a period ranging from about 30 minutes to 24 hours and within the preferred temperature range within a period of from one to two hours. The 16-cyano-17-keto steroid is obtained by the usual procedures of washing, evaporation of solvent and crystallization.

The ketone moiety of the 16-cyano-17-keto steroid can be preferentially reduced without reducing the cyano substituent by the use of a reducing agent such as, for example, lithium borohydride. The product obtained is a 17β-hydroxy-16-cyano steroid. In carrying out the reduction procedures, a solvent inert to the reactants such as, for example, tetrahydrofuran is desirable and the reaction is usually carried out at room temperature by procedures well known in the art. As described above, the 3-ethylene ketal blocking group can be removed by mild acid hydrolysis regenerating a $\Delta^4$-3-keto steroid.

Some of the compounds of the present invention, namely, the hydroxymethylene derivatives and the β-ketonitriles may exist in different tautomeric forms. These forms are as follows:

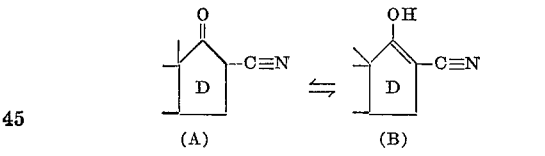

and

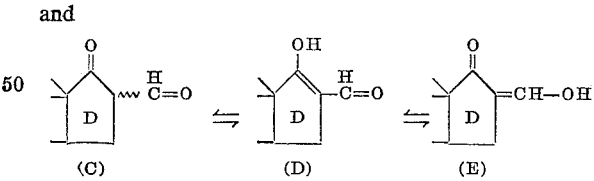

An analysis of the infrared spectra (in potassium bromide discs) and in certain cases of the ultraviolet spectra of the β-ketonitriles indicates that these compounds predominately have the ketonic structure A. On the basis of a spectroscopic analysis of the hydroxymethylene (or formyl) derivatives, it is considered that these compounds predominately are in the enolic form having structures E and/or D. Since the prior art has assigned the hydroxymethylene structure to products of this nature, we herein refer to these products as hydroxymethylene derivatives (E), it, however, being understood that the specification will in no way be defective if it should later be shown that these compounds are predominately in another tautomeric form.

The alpha configuration is assigned to the cyano derivatives of this invention on the basis of an analysis of spectroscopic and polarimetric evidence and on theoretical grounds. However, it should be noted that it is difficult to make a definite configurational assignment at the 16-position [see Ellis et al., J. Chem. Soc., 800 (1956); J. Fajkos, Coll. Czech. Chem. Comm., 24,766 (1959); C. W. Shoppee et al., J. Chem. Soc., 3048 (1958)]. Thus, this assignment of configuration is made on the basis of the best evidence presently available to organic chemists and so as to provide a more definitive exposition of this invention. However, it should be understood that this specification will in no way be defective if it should later be shown that these compounds have the β-configuration.

The estratriene derivatives of the present invention have estrogenic activity and may be used in estrogenic therapy and as agents for lowering blood cholesterol levels, hence as anti-atherosclerotic agents. The androstene derivatives of this invention are central nervous system depressants and are therefore useful as tranquilizers or muscle relaxants. In some instances the androstene compounds are intermediates for preparing the active compounds.

The following examples illustrate in detail the preparation of the substituted androstenes and estratrienes of the present invention.

EXAMPLE I

*Preparation of 16α-Cyano-3-Ethylenedioxy-5-Androsten-17-One*

To a solution of 1.12 g. (3.4 mmole (of 3-ethylenedioxy-5-androsten-17-one (J. Am. Chem. Soc., 76, 1359 (1954) in 70 cc. of anhydrous benzene is added 1 cc. of freshly distilled ethyl formate and 0.6 g. of a sodium hydride in oil suspension. The reaction is started by the addition of a few drops of dry ethanol and the mixture is stirred under nitrogen for 20 hours. The dark brown suspension is treated with a little methanol to destroy excess sodium hydride and then with 25 cc. of water. The layers are separated and the benzene phase is washed with three portions of water. The combined water extracts are washed once with ether and are then neutralized by the addition of 30% aqueous sodium dihydrogen phosphate solution. The mixture is extracted with several portions of chloroform and the combined extracts are washed with water and dried and evaporated. The dry desidue is crystallized from ether and recrystallized from methylene chloride-ether to give 711 mg. of 3-ethylenedioxy - 16 - hydroxymethylene-5-androsten-17-one, a white solid melting at 203–206° C.

A mixture of 6.95 g. (100 mmole) of hydroxylamine hydrochloride and 50 cc. of trifluoroacetic anhydride is heated with stirring under reflux for one hour. All of the solid goes into solution during this period. The mixture is evaporated under reduced pressure and the oily residue is crystallized from a small amount of methylene chloride-pentane. The white crystalline solid is collected, washed with pentane and dried under reduced pressure at room temperature over phosphorus pentoxide. There is obtained 14 g. (62%) of O,N-bis-(trifluoroacetyl)-hydroxylamine, melting point 59–60° C.

To a solution of 358 mg. (1 mmole) of 3-ethylenedioxy-16-hydroxymethylene-5-androsten-17-one in 10 cc. of dry benzene is added 225 mg. (1 mmole) of O,N-bis-(trifluoroacetyl)-hydroxylamine and 0.3 cc. of dry pyridine. The mixture is allowed to reflux for two hours and is then diluted with 20 cc. of benzene and washed several times with water. The benzene phase is dried and evaporated to a crystalline residue which is recrystallized from ether to give 248 mg. of 16α-cyano-3-ethylenedioxy-5-androsten-17-one melting at 236–238° C. For analysis a sample is recrystallized again, from methylene chloride-ether; melting point 240–242° C.; $[\alpha]_D^{25}+4.3°$ (±21°) (c. 0.234 in CHCl$_3$);

$\lambda_{max.}^{KBr}$ 4.46μ (m), 5.68μ (s); $\lambda_{max.}^{MeOH}$ 268 mμ

(ε 12,980) in base (no U.V. maxima in neutral solution).

EXAMPLE II

*Preparation of 16α-Cyanotestosterone (16α-Cyano-17β-Hydroxy-4-Androsten-3-One)*

Solvent (5 cc.) is distilled out of a solution of 16α-cyano-3-ethylenedioxy-5-androsten-17-one in 40 ml. of peroxide-free tetrahydrofuran. The solution is cooled to 0° C., and 150 mg. of lithium borohydride is added. The mixture is stirred at room temperature for three hours and excess hydride is then destroyed by addition of about 2 cc. of acetic acid followed by water until gas evolution ceased. The mixture is evaporated in a 50° C. bath, and the wet residue is distributed between methylene chloride and water. The organic phase is washed with water and saturated saline solution and then dried and evaporated. The residue, 16α-cyano-3-ethylenedioxy-17β-hydroxy-5-androsten, is dissolved partially in 10 cc. of 50% acetic acid and the stirred mixture is heated on the steam bath for 30 minutes when all the solid dissolves. The resulting solution is evaporated and the residue is dissolved in methylene chloride and water. The organic phase is washed with a little water and then dried and evaporated. The residue is crystallized from ethyl acetate: 88 mg. (49%), melting point 190–192° C. One recrystallization from ethyl acetate gives a sample melting at 218–219° C.; $[\alpha]_D^{25}+88.5$ (c. 0.521 in CHCl$_3$);

$\lambda_{max.}^{KBr}$ 2.87μ (m), 4.44μ (w), 5.96μ (s) broad band, 6.16μ (m). $\lambda_{max.}^{MeOH}$ 240 mμ

(ε 16,170) in methanol, 247 mμ (ε 15,680) in base.

EXAMPLE III

*16α-Cyanoestrone 3-Methyl Ether*

Benzene (20 cc.) is distilled from a solution of 0.97 g. (3.46 mole) of estrone 3-methyl ether in 100 cc. of benzene. To the cooled solution is added 1 cc. of redistilled ethyl formate and 0.6 g. of sodium hydride-oil suspension. A few drops of ethanol are added to start the reaction and the mixture is stirred under nitrogen overnight. Excess sodium hydride is then decomposed by addition of a little methanol and the reaction mixture is extracted successively with portions of water, 1% aqueous potassium hydroxide and water. The extracts are combined, washed twice with a little ether and then neutralized with 30% aqueous sodium dihydrogen phosphate solution. This mixture is extracted with chloroform and the chloroform extract is washed with water, dried and evaporated to give a white crystalline solid which is collected with ether: 855 mg. (80%), melting point 166–174° C. For analysis a sample is recrystallized twice from methylene chloride-ether giving 16-hydroxymethyleneestrone-3-methyl ether with a melting point of 169–179° C.

The reaction of 1.7 g. (5.45 mmole) of 16-hydroxymethyleneestrone 3-methyl ether with 1.22 g. of O,N-bis-(trifluoroacetyl)-hydroxylamine in 54 cc. of benzene and 1.63 cc. of pyridine is carried out as described in Example II. The product is crystallized from ether to give 1.16 g. (69%), melting point 149–153°. Several recrystallizations from methylene chloride-ether gives material with melting point 138–148°; $[\alpha]_D^{25}+$(c. 0.99 in CHCl$_3$);

$\lambda_{max.}^{KBr}$ 4.43μ (w), 5.68μ (s), 6.17μ (m), 6.32μ (w)

EXAMPLE IV

*16α-Cyanoestradiol 3-Methyl Ether*

A solution of 1.56 g. (5.05 mmole) of 16α-cyanoestrone 3-methyl ether in 150 cc. of tetrahydrofuran is reduced with 360 mg. of lithium borohydride for three hours at room temperature. Acetic acid is added carefully and then watered until the solution is homogeneous. Removal of most of the solvents under reduced pressure gives a residue which is triturated with water and filtered. The precipitate is washed with water and then dissolved in methylene chloride. The resulting solution is washed with a little water and then dried and evaporated to give 1.5 g. of product which is recrystallized from methylene chloride-ether; 1.17 g. (74%), melting point 194–200° C. For analysis a sample is recrystallized from ethyl acetate: melting point 197–200°; $[\alpha]_D^{25} + 54°$ (c. 1.39 in $CHCl_3$);

$\lambda_{max.}^{KBr}$ 2.86$\mu$ (s), 4.47$\mu$ (m)

no absorption in the carbonyl region.

This application is a continuation-in-part of our application Serial No. 49,404, filed August 15, 1960, now abandoned.

We claim:

1. A steroid having the formula:

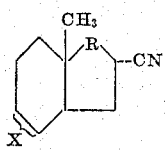

in which R is a divalent radical of the group consisting of:

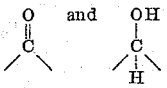

groups and X is a divalent radical of the group consisting of:

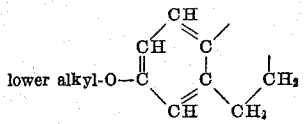

and

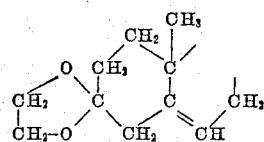

radicals.

2. The compound 3-ethylenedioxy-16-hydroxy-methylene-5-androsten-17-one.

3. The compound 16α-cyano-3-ethylenedioxy-5-androsten-17-one.

4. The compound 16α-cyanotestosterone.

5. The compound 16α-cyanoestrone 3-methyl ether.

6. The compound 16α-cyanoestradiol 3-methyl ether.

7. The compound 16α-cyano-3-ethylenedioxy-17β-hydroxy-5-androstene.

8. A method of preparing 16α-cyano steroids of the androstane and estratriene series which comprises reacting a member selected from the group consisting of 16-hydroxymethylene-17-ketoandrostanes, 16-hydroxymethylene-17-ketoestratrienes and tautomeric forms with O,N-bis-trifluoroacetylhydroxylamine and thereafter isolating said compounds from the reaction mixture.

No references cited.